United States Patent
Gilson et al.

(10) Patent No.: US 11,469,813 B2
(45) Date of Patent: Oct. 11, 2022

(54) RADIO FREQUENCY-BASED REPEATER IN A WAVEGUIDE SYSTEM

(71) Applicant: Raytheon Technologies Corporation, Farmington, CT (US)

(72) Inventors: Jonathan Gilson, West Hartford, CT (US); Joseph V. Mantese, Ellington, CT (US); Goran Djuknic, New York, NY (US); Gurkan Gok, Milford, CT (US); Brenda J. Lisitano, Middletown, CT (US); Sanjay Bajekal, Simsbury, CT (US); Coy Bruce Wood, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/245,444

(22) Filed: Apr. 30, 2021

(65) Prior Publication Data

US 2021/0250081 A1    Aug. 12, 2021

Related U.S. Application Data

(63) Continuation of application No. 16/692,119, filed on Nov. 22, 2019, now Pat. No. 10,998,958.

(51) Int. Cl.
*H04B 7/155*   (2006.01)
*F02C 9/00*   (2006.01)
(Continued)

(52) U.S. Cl.
CPC ......... *H04B 7/15528* (2013.01); *F02C 9/00* (2013.01); *H04B 3/52* (2013.01); *H04B 3/36* (2013.01)

(58) Field of Classification Search
CPC ........ H04B 7/15528; H04B 3/52; H04B 3/36; F02C 9/00
See application file for complete search history.

(56) References Cited

U.S. PATENT DOCUMENTS

| 5,267,436 A | 12/1993 | Wood, Jr. et al. |
| 7,455,495 B2 | 11/2008 | Leogrande et al. |

(Continued)

FOREIGN PATENT DOCUMENTS

EP    3291570 A1    3/2018

OTHER PUBLICATIONS

EP Application No. 20205026.6 Extended EP Search Report dated Mar. 24, 2021, 9 pages.

(Continued)

*Primary Examiner* — Yuwen Pan
*Assistant Examiner* — Angelica M Perez
(74) *Attorney, Agent, or Firm* — Cantor Colburn LLP

(57) ABSTRACT

A system of a machine includes a network of nodes distributed throughout the machine. Each of the nodes is operable to communicate using a plurality of electromagnetic signals. A controller is operable to communicate with the nodes using electromagnetic signals. The system also includes a plurality of waveguides configured to guide transmission of the electromagnetic signals between the controller and one or more of the nodes. A radio frequency-based repeater is coupled to at least two of the waveguides in the network between the controller and at least one of the nodes. The radio frequency-based repeater is configured to operate using power extracted from at least one of the electromagnetic signals when a signal-to-noise ratio is above a threshold, and the radio frequency-based repeater is configured to use energy stored in an onboard energy storage system when the signal-to-noise ratio is below the threshold.

20 Claims, 5 Drawing Sheets

(51) Int. Cl.
*H04B 3/52* (2006.01)
*H04B 3/36* (2006.01)

(56) References Cited

U.S. PATENT DOCUMENTS

| | | |
|---|---|---|
| 7,464,585 B2 | 12/2008 | Schwarz et al. |
| 7,570,169 B2 | 8/2009 | Li et al. |
| 7,769,507 B2 | 8/2010 | Volponi et al. |
| 7,844,385 B2 | 11/2010 | Loda et al. |
| 7,927,067 B2 | 4/2011 | Rajamani et al. |
| 8,026,857 B2 | 9/2011 | Bommer |
| 8,074,498 B2 | 12/2011 | Agrawal et al. |
| 8,085,108 B2 | 12/2011 | Philippe |
| 8,204,671 B2 | 6/2012 | Agrawal et al. |
| 8,256,277 B2 | 9/2012 | Khibnik et al. |
| 8,424,279 B2 | 4/2013 | Rajamani et al. |
| 8,459,103 B2 | 6/2013 | Khilbnik et al. |
| 8,570,152 B2 | 10/2013 | Fahley et al. |
| 8,733,149 B2 | 5/2014 | Yu et al. |
| 8,754,320 B2 | 6/2014 | Mantese |
| 8,800,261 B2 | 8/2014 | Hall et al. |
| 8,820,088 B2 | 9/2014 | Gilson et al. |
| 8,973,364 B2 | 3/2015 | Gilson et al. |
| 8,997,497 B2 | 4/2015 | Hall et al. |
| 9,051,897 B2 | 6/2015 | Schwarz et al. |
| 9,599,637 B2 | 3/2017 | Mantese et al. |
| 9,745,918 B2 | 8/2017 | Gilson et al. |
| 9,920,653 B2 | 3/2018 | Lord et al. |
| 9,932,933 B2 | 4/2018 | Lord et al. |
| 9,986,310 B2 | 5/2018 | Sobanski et al. |
| 9,990,576 B2 | 6/2018 | Nardi et al. |
| 10,051,345 B2 | 8/2018 | Mantese et al. |
| 10,057,663 B2 | 8/2018 | Sobanski et al. |
| 10,066,548 B2 | 9/2018 | Gilson et al. |
| 10,080,068 B2 | 9/2018 | Sobanski |
| 10,091,562 B2 | 10/2018 | Mantese et al. |
| 10,107,132 B2 | 10/2018 | Wu et al. |
| 10,107,191 B2 | 10/2018 | Gilson et al. |
| 10,140,566 B2 | 11/2018 | Viikari |
| 10,145,729 B2 | 12/2018 | Viikari et al. |
| 10,184,340 B2 | 1/2019 | Baltas et al. |
| 10,253,417 B2 | 4/2019 | Viens et al. |
| 10,253,984 B2 | 4/2019 | Pearson et al. |
| 10,301,971 B2 | 5/2019 | Lord et al. |
| 10,337,121 B2 | 7/2019 | Mantese et al. |
| 10,362,115 B2 | 7/2019 | Bommer et al. |
| 10,371,051 B2 | 8/2019 | Gilson et al. |
| 10,405,066 B2 | 9/2019 | Sobanski et al. |
| 10,410,814 B2 | 9/2019 | Mantese et al. |
| 10,419,831 B2 | 9/2019 | Mantese et al. |
| 10,461,973 B2 | 10/2019 | Nikunen et al. |
| 10,469,920 B2 | 11/2019 | Zacchio et al. |
| 10,484,760 B2 | 11/2019 | Mantese et al. |
| 10,491,970 B2 | 11/2019 | Sobanski et al. |
| 10,531,166 B2 | 1/2020 | Mantese et al. |
| 10,581,279 B2 | 3/2020 | Mantese et al. |
| 10,589,351 B2 | 3/2020 | Rebbecchi et al. |
| 10,638,207 B2 | 4/2020 | Mantese et al. |
| 10,655,538 B2 | 5/2020 | Gilson et al. |
| 10,711,367 B2 | 7/2020 | Mantese et al. |
| 10,826,547 B1 | 11/2020 | Gilson et al. |
| 2005/0040934 A1 | 2/2005 | Shanton |
| 2007/0119257 A1 | 5/2007 | Hayasaka et al. |
| 2008/0153415 A1 | 6/2008 | Block et al. |
| 2009/0184877 A1* | 7/2009 | Bommer ............... H02J 50/80 343/708 |
| 2010/0129202 A1 | 5/2010 | Garner |
| 2010/0287907 A1 | 11/2010 | Agrawal et al. |
| 2010/0321191 A1 | 12/2010 | Gong et al. |
| 2013/0219922 A1 | 8/2013 | Gilson et al. |
| 2013/0283821 A1 | 10/2013 | Gilson et al. |
| 2014/0015642 A1* | 1/2014 | White ............... G06K 7/10168 340/10.1 |
| 2014/0113671 A1 | 4/2014 | Schwengler |
| 2014/0144153 A1 | 5/2014 | Healy |
| 2014/0366554 A1 | 12/2014 | Gilson et al. |
| 2016/0040604 A1 | 2/2016 | Hrach et al. |
| 2016/0108854 A1 | 4/2016 | Lord et al. |
| 2016/0169939 A1 | 6/2016 | Tokgoz et al. |
| 2016/0313139 A1 | 10/2016 | Klecka et al. |
| 2016/0319837 A1 | 11/2016 | Morris et al. |
| 2016/0356866 A1 | 12/2016 | Attridge et al. |
| 2016/0370256 A1 | 12/2016 | Zacchio et al. |
| 2017/0286820 A1 | 10/2017 | Nikunen et al. |
| 2017/0366228 A1 | 12/2017 | Bobrek et al. |
| 2018/0209379 A1 | 7/2018 | Lord et al. |
| 2018/0238574 A1* | 8/2018 | Ky ............... H01Q 1/2291 |
| 2018/0289359 A1 | 10/2018 | Heims et al. |
| 2018/0294838 A1 | 10/2018 | Snyder et al. |
| 2018/0360312 A1 | 12/2018 | Gupta et al. |
| 2018/0372563 A1 | 12/2018 | Rogers et al. |
| 2019/0127877 A1 | 5/2019 | Mantese et al. |
| 2019/0345835 A1 | 11/2019 | Terwilliger et al. |
| 2020/0025036 A1 | 1/2020 | Lord et al. |
| 2021/0159930 A1 | 5/2021 | Gilson et al. |
| 2021/0160593 A1 | 5/2021 | Gilson et al. |

OTHER PUBLICATIONS

EP Application No. 20205028.2 Extended EP Search Report dated Mar. 25, 2021, 8 pages.
EP Application No. 20205031.6 Extended EP Search Report dated Mar. 24, 2021, 9 pages.
Hotte, et al., "A Concept of Pressure Sensor Based on Slotted Waveguide Antenna Array for Passive MMID Sensor Networks", IEEE Sensors Journal, vol. 16, No. 14, Jul. 15, 2016, 5 pages.
Wenqiang, et al., "A novel physical parameters measuring method using wireless passive sensor in harsh environment", 2015 IEEE 12th International Conference on Electronic Measurement & Instruments, vol. 3, Jul. 16, 2015, pp. 1481-1485.

* cited by examiner

RADIO FREQUENCY-BASED REPEATER IN A WAVEGUIDE SYSTEM

CROSS-REFERENCE TO RELATED APPLICATIONS

This application is a continuation of U.S. application Ser. No. 16/692,119 filed Nov. 22, 2019, the disclosure of which is incorporated herein by reference in its entirety.

BACKGROUND

This disclosure relates to electromagnetic communication, and more particularly to a radio frequency-based repeater in a waveguide system.

As control and health monitoring systems become more complex, the interconnect count between system components increases, which also increases failure probabilities. With the increase in interconnects, troubleshooting systems may not always identify the contributing faulty components reliably when system anomalies occur. Failures associated with such systems are often due to connection system failures, including: sensors, wiring, and connectors that provide interconnection (e.g., signal and power) between all components.

Difficulties can arise when troubleshooting these complex interconnected systems, especially when the systems include subsystems having electronic components connected to control system devices, such as actuators, valves or sensors. For example, a noisy signal in a sensor reading could be caused by a faulty interface circuit in the electronic component, a faulty wire or short(s) in the cable system, and/or a faulty or intermittent sensor. The time associated with identifying a faulty component quickly and accurately affects operational reliability.

Detailed knowledge of machinery operation for control or health monitoring requires sensing systems that need information from locations that are sometimes difficult to access due to moving parts, internal operating environment or machine configuration. The access limitations make wire routing bulky, expensive and vulnerable to interconnect failures. The sensor and interconnect operating environments for desired sensor locations often exceed the capability of the interconnect systems. In some cases, cable cost, volume and weight exceed the desired limits for practical applications.

Application of electromagnetic sensor and effector technologies to address the wiring constraints faces the challenge of providing reliable communications in a potentially unknown environment with potential interference from internal or external sources. Large-scale deployments of multiple sensors and/or effectors with varying signal path lengths further increases the challenges of normal operation and fault detection in a network of connected nodes.

BRIEF DESCRIPTION

According to one embodiment, a system of a machine includes a network of nodes distributed throughout the machine. Each of the nodes is operable to communicate using a plurality of electromagnetic signals. A controller is operable to communicate with the nodes using electromagnetic signals. The system also includes a plurality of waveguides configured to guide transmission of the electromagnetic signals between the controller and one or more of the nodes. A radio frequency-based repeater is coupled to at least two of the waveguides in the network between the controller and at least one of the nodes. The radio frequency-based repeater is configured to extract power from at least one of the electromagnetic signals when a signal-to-noise ratio is above a threshold, and the radio frequency-based repeater is configured to use energy stored in an onboard energy storage system when the signal-to-noise ratio is below the threshold.

In addition to one or more of the features described above or below, or as an alternative, further embodiments may include where the radio frequency-based repeater is configured to determine the signal-to-noise ratio and cause power extraction based on the signal-to-noise ratio.

In addition to one or more of the features described above or below, or as an alternative, further embodiments may include where the radio frequency-based repeater includes an antenna, a communication interface, a memory, and a processing unit configured to execute a plurality of instructions stored in the memory to boost a transmission characteristic of the portion of the electromagnetic signals through the communication interface and the antenna.

In addition to one or more of the features described above or below, or as an alternative, further embodiments may include where the communication interface includes a software defined radio.

In addition to one or more of the features described above or below, or as an alternative, further embodiments may include where the radio frequency-based repeater includes a power conditioning circuit, and the onboard energy storage system is configured to extract and store a portion of energy received from a transmission to power the radio frequency-based repeater.

In addition to one or more of the features described above or below, or as an alternative, further embodiments may include where the onboard energy storage system is charged based on detecting excess energy in at least one of the electromagnetic signals.

In addition to one or more of the features described above or below, or as an alternative, further embodiments may include where the radio frequency-based repeater is actively powered based on detecting availability of a power source.

According to an embodiment, a system for a gas turbine engine includes a network of nodes distributed throughout the gas turbine engine. Each of the nodes is associated with at least one sensor or effector of the gas turbine engine and is operable to communicate using a plurality of electromagnetic signals. A controller of the gas turbine engine is operable to communicate with the nodes using electromagnetic signals. A plurality of waveguides is configured to guide transmission of the electromagnetic signals between the controller and one or more of the nodes. A radio frequency-based repeater is coupled to at least two of the waveguides in the network between the controller and at least one of the nodes. The radio frequency-based repeater includes a means for extracting power from at least one of the electromagnetic signals when a signal-to-noise ratio is above a threshold and using stored energy when the signal-to-noise ratio is below the threshold.

In addition to one or more of the features described above or below, or as an alternative, further embodiments may include where one or more of the nodes are located at least one of a fan section, a compressor section, a combustor section and a turbine section of the gas turbine engine, and the at least one sensor is configured to monitor one or more of a pressure, a temperature, a speed, a position, and a vibration.

In addition to one or more of the features described above or below, or as an alternative, further embodiments may include where the means includes a power conditioning circuit and an onboard energy storage system configured to extract and store a portion of energy received from a transmission to power the radio frequency-based repeater.

According to an embodiment, a method of establishing electromagnetic communication through a machine includes configuring a network of nodes to communicate using a plurality of electromagnetic signals, where the nodes are distributed throughout the machine. A controller initiates communication with the nodes using electromagnetic signals. Transmission of the electromagnetic signals is confined in a plurality of waveguides between the controller and one or more of the nodes. A portion of the electromagnetic signals in a first waveguide of the plurality of waveguides is received at a radio frequency-based repeater, where the radio frequency-based repeater is coupled to at least two of the waveguides in the network between the controller and at least one of the nodes. The radio frequency-based repeater is operated using power extracted from at least one of the electromagnetic signals when a signal-to-noise ratio is above a threshold and using energy stored in an onboard energy storage system when the signal-to-noise ratio is below the threshold.

A technical effect of the apparatus, systems and methods is achieved by using one or more radio frequency-based repeaters in a waveguide system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
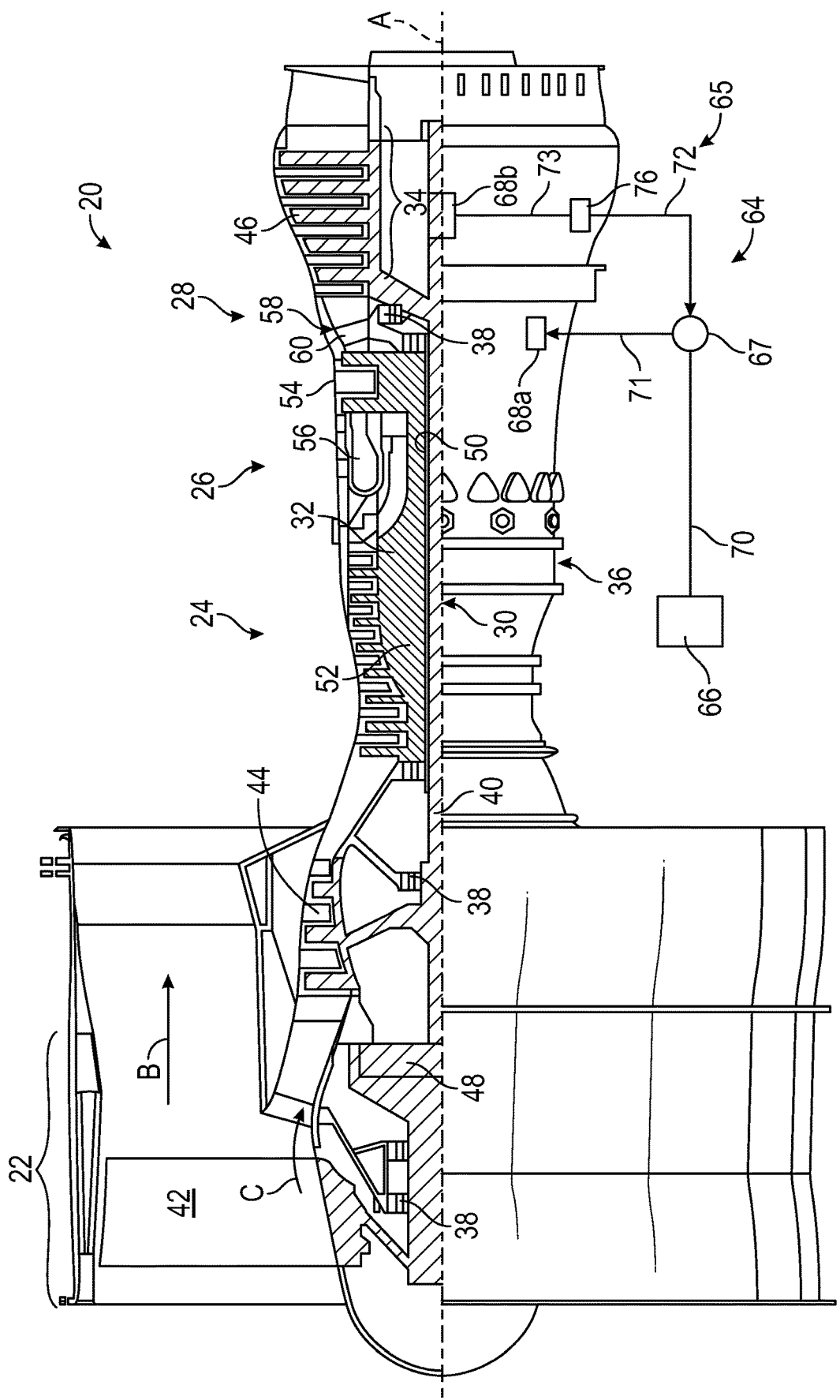
FIG. 1 is a cross-sectional view of a gas turbine engine as an example of a machine.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. Alternative engines may include an augmentor section (not shown) among other systems or features. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an effector node that can drive one or more effectors/actuators of the gas turbine engine 20. Node 68b is an example of a sensor node that can interface with one or more sensors of the gas turbine engine 20. Nodes 68a, 68b can include processing support circuitry to transmit/receive electromagnetic signals between sensors or effectors and the controller 66. A coupler 67 can be configured as a splitter between a waveguide 70 coupled to the controller 66 and waveguides 71 and 72 configured to establish guided electromagnetic transmission communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the electromagnetic signals between the controller 66 and one or more of the nodes 68a, 68b. The transmission media within waveguides 70-73 may include dielectric or gaseous material. The disclosed system 64 may be utilized to control and/or monitor any component function or characteristic of a turbomachine, aircraft component operation, and/or other machines.

Prior control & diagnostic system architectures utilized in various applications include centralized system architecture in which the processing functions reside in an electronic control module. Redundancy to accommodate failures and continue system operation systems can be provided with dual channels with functionality replicated in both control channels. Actuator and sensor communication is accomplished through analog wiring for power, command, position feedback, sensor excitation and sensor signals. Cables and connections include shielding to minimize effects caused by electromagnetic interference (EMI). The use of analog wiring and the required connections limits application and capability of such systems due to the ability to locate wires, connectors and electronics in small and harsh environments that experience extremes in temperature, pressure, and/or vibration. Exemplary embodiments can use radio frequencies confined to waveguides 70-73 in a guided electromagnetic transmission architecture to provide both electromagnetic signals and power to the individual elements of the network 65. One or more instances of the radio frequency-based repeater 76 can propagate signal and power to extend the network 65 with higher than normal loss elements.

The radio frequency-based repeater 76 can provide a number of functions, such as band limiting acquired noise as an electromagnetic signal is transmitted through waveguides 72-73, boosting a digital signal-to-noise (SNR), boosting an analog signal level power, and refocusing transmission through a directed antenna. In various embodiments, the radio frequency-based repeater 76 can either be actively powered through a supplemental active power source, such as fixed "wired" leads, or powered by radio frequency rectification of a continuous electromagnetic wave, and thus self-powered. Multiple instances of the radio frequency-based repeater 76 can be cascaded within the network 65 to account for parasitic losses and boost SNR level. The radio frequency-based repeater 76 thus filters out-of-band coherent and incoherent noise that could potentially disrupt communications or device performance. The radio frequency-based repeater 76 can also be used to refocus electromagnetic energy in the form of radio frequency along the center of the waveguides 72-73 to reduce additional parasitic losses.

The use of electromagnetic radiation in the form of radio waves (MHz to GHz) to communicate and power the sensors and effectors using a traditionally complex wired system enables substantial architectural simplification, especially as it pertains to size, weight, and power (SWaP). Embodiments of the invention enable extension of a network where reduced SNR would compromise network performance by trading off data rates for an expansion of the number of nodes and distribution lines; thereby enabling more nodes/sensors, with greater interconnectivity.

Figure 2:
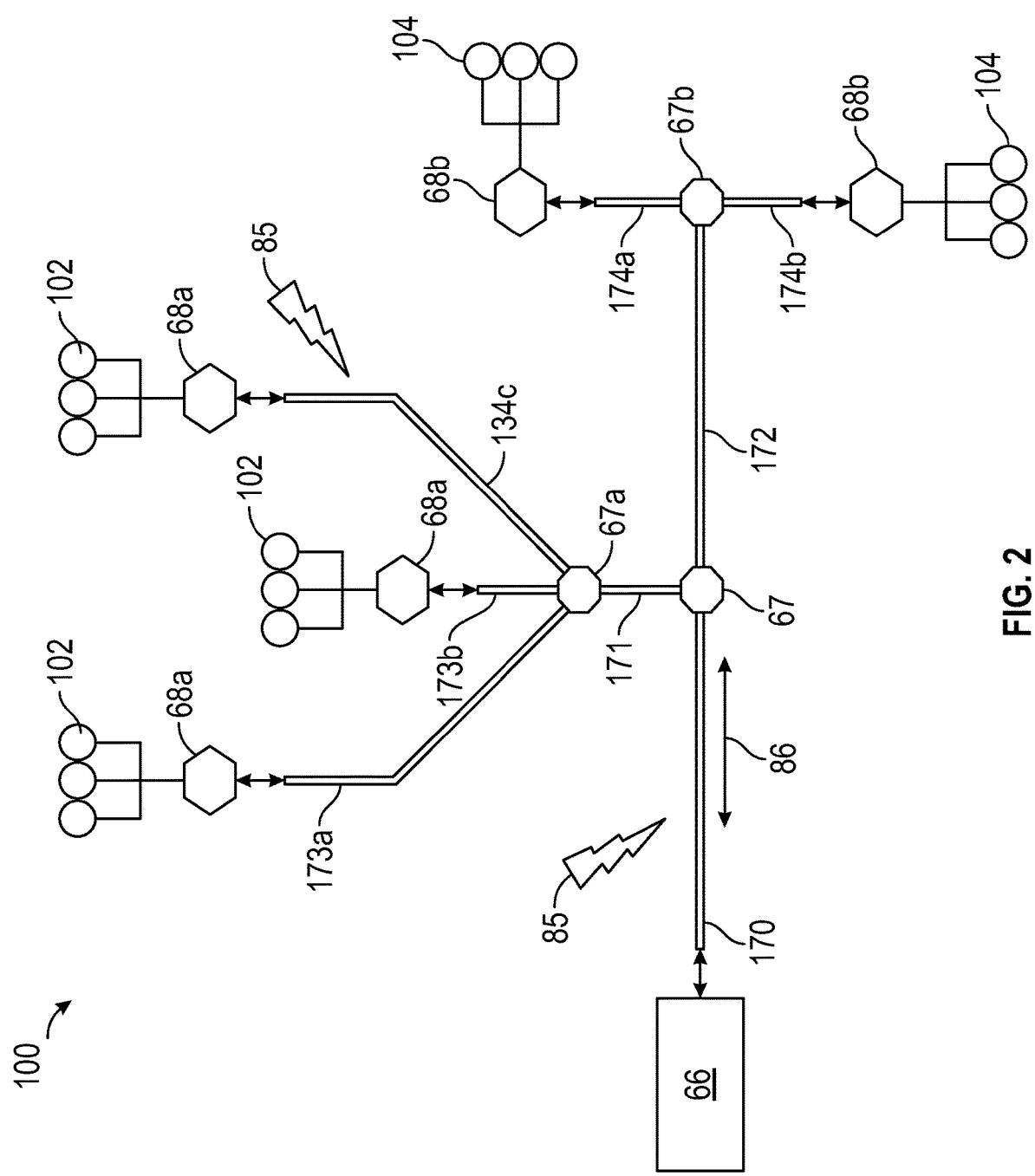
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Couper 67a is further coupled to three nodes 68a through waveguides 173a, 173b, 173c in parallel. Each of the nodes 68a can interface or be combined with multiple effectors 102. Coupler 67b is also coupled to two nodes 68b through waveguides 174a, 174b in parallel. Each of the nodes 68b can interface or be combined with multiple sensors 104. Although the example of FIG. 2 depicts connections to effectors 102 and sensors 104 isolated to different branches, it will be understood that effectors 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification (RFID) devices along with processing, memory and/or the interfaces to connect to conventional sensors or effectors, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and enable unauthorized access to information. In some embodiments, confined electromagnetic radiation is in the range 1-100 GHz. Electromagnetic radiation can be more tightly confined around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with effectors 102 may include control devices, such as a solenoid, switch or other physical actuation devices. RFID, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The shielding in the guided electromagnetic transmission network 100 can be provided such that power and communication signals are shielded from outside interference, which may be caused by environmental electromagnetic or optic interference. Moreover, the shielding prevents intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, pure environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for each monitored or controlled components to enable the use of a guided electromagnetic transmission network. For example, the system 64 can be incorporated in a variety of harsh environment machines, such as an elevator system, heating, ventilation, and air conditioning (HVAC) systems, manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that enables consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy without significantly increasing cost. Moreover, additional sensors can be added without the need for additional wiring and connections that provide for increased system accuracy and response. Finally, the embodiments enable a "plug-n-play" approach to add a new node, potentially without a requalification of the entire system but only the new component; thereby greatly reducing qualification costs and time.

Figure 3:
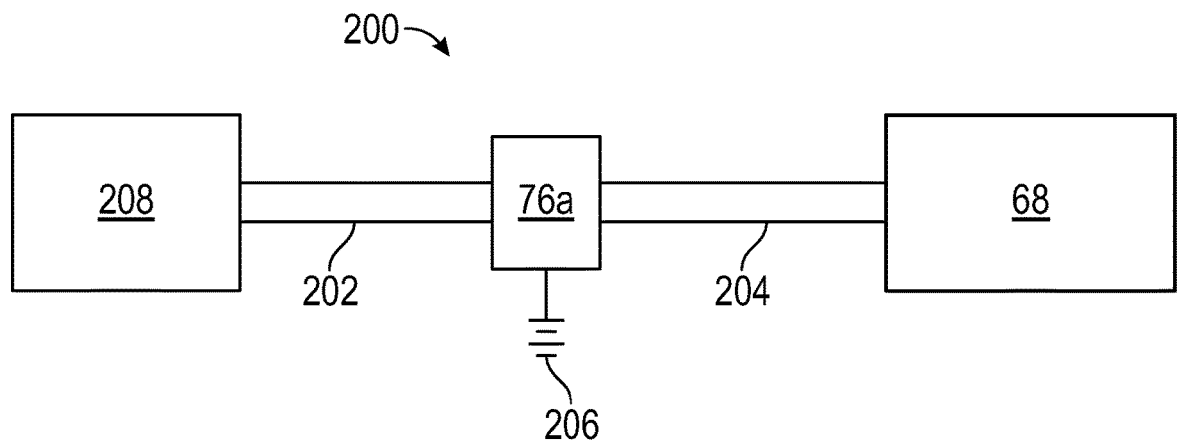
FIG. 3 is a schematic view of a communication path through waveguides including a radio frequency-based repeater configured as an active repeater in accordance with an embodiment of the disclosure.

FIG. 3 is a schematic view of a communication path 200 through waveguides 202 and 204 including a radio frequency-based repeater 76a configured as an active repeater. The communication path 200 can be part of network 65, 100, or another guided electromagnetic transmission network. The radio frequency-based repeater 76a is an example of the radio frequency-based repeater 76 of FIG. 1 powered by a power source 206 other than energy received from a transmission on waveguides 202, 204. For example, the power source 206 can be a battery, a super-capacitor, an ultra-capacitor, or other source of electrical power. In the example of FIG. 3, electromagnetic signals can propagate in the waveguides 202, 204 between a source node 208 and a node 68. Source node 208 can be the controller 66 of FIGS. 1 and 2 or a coupler, such as coupler 67, 67a, 67b of FIG. 2. As a further example, the source node 208 can be another instance of repeater 76 in a cascaded configuration. The node 68 can be a node 68a, 68b of FIGS. 1 and 2, which may include or be further coupled to one or more effectors 102 or sensors 104 of FIG. 2. The radio frequency-based repeater 76a can use power from the power source 206 to boost a transmission characteristic of a portion of the electromagnetic signals in one of the waveguides 202, 204. For instance, if communication is from source node 208 to node 68, the radio frequency-based repeater 76a can receive a portion of electromagnetic signals from source node 208 in waveguide 202 as a first waveguide and boost a transmission characteristic of the portion of the electromagnetic signals in waveguide 204 as a second waveguide. Thus, the portion of the electromagnetic signals received at node 68 can be improved with an increased digital signal-to-noise ratio, an increased analog signal power level, and/or a refocused transmission through waveguide 204 for reduced noise/ parasitic effects. Although the example of FIG. 3 depicts a 2-port configuration to support connections with two waveguides 202, 204, it will be understood that additional ports can be added to further split transmissions in multiple waveguides, such as the configuration of couplers 67, 67a, 67b of FIG. 2 and beyond.

Figure 4:
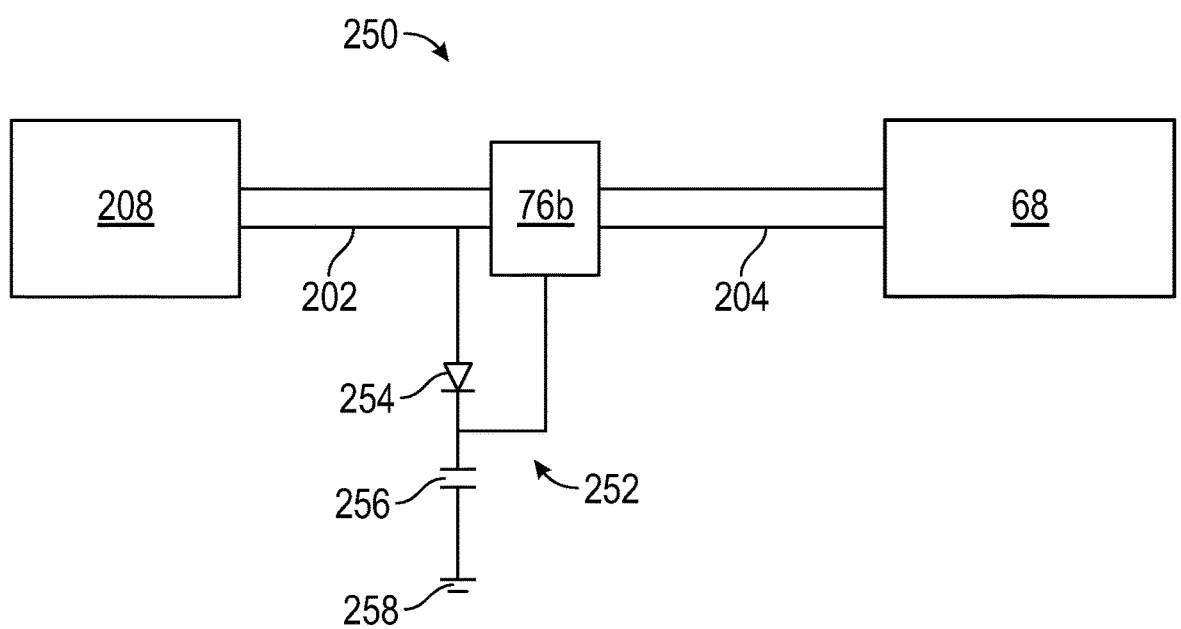
FIG. 4 is a schematic view of a communication path through waveguides including a radio frequency-based repeater configured as a passive repeater in accordance with an embodiment of the disclosure.

FIG. 4 is a schematic view of a communication path 250 through waveguides 202 and 204 including a radio frequency-based repeater 76b configured as a passive repeater. The communication path 250 can be part of network 65, 100, or another guided electromagnetic transmission network. The radio frequency-based repeater 76b is an example of the radio frequency-based repeater 76 of FIG. 1 powered by a power extraction circuit 252. The power extraction circuit 252 extracts power from electromagnetic transmissions in a waveguide 202 to provide power to circuitry of the radio frequency-based repeater 76b. The power extraction circuit 252 can be a passive rectifier including a diode 254 in series with a capacitor 256 and ground 258. For example, the power extraction circuit 252 can be a half-wave rectifier that extracts power from electromagnetic signals received in a first waveguide 202 while also boosting a transmission characteristic of the portion of the electromagnetic signals in a second waveguide 204, where electromagnetic signals propagate in the waveguides 202, 204 between a source node 208 and a node 68.

Figure 5:
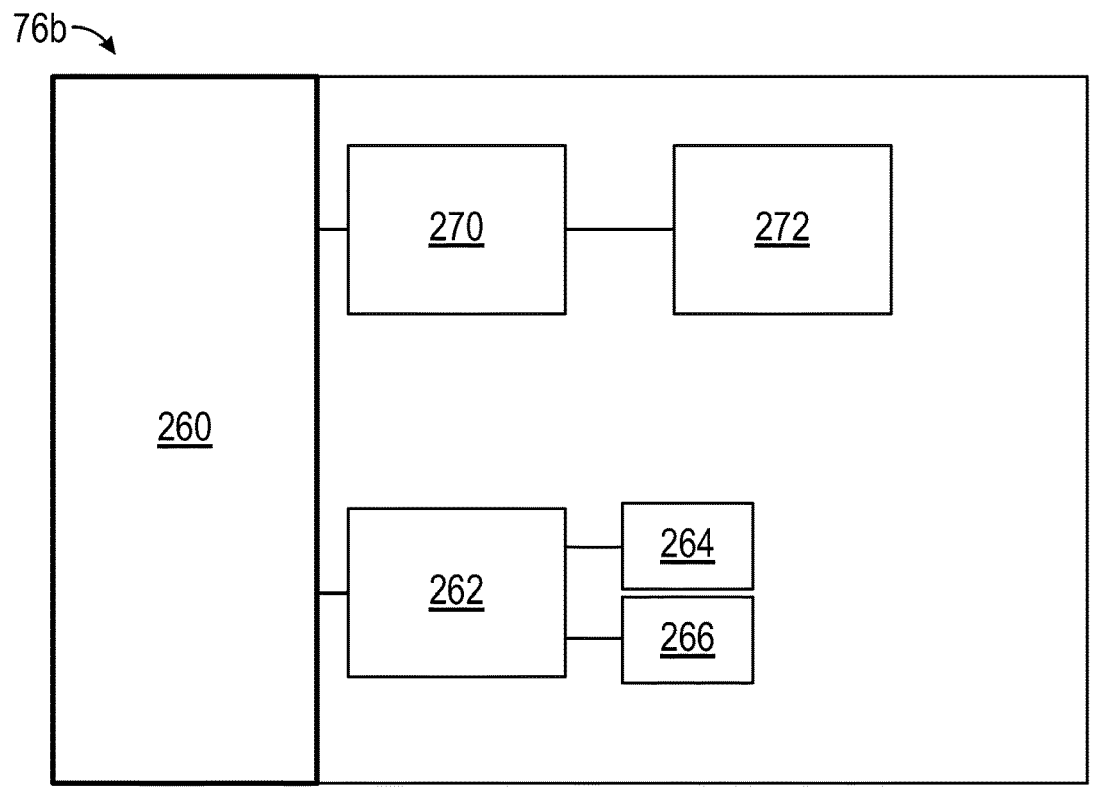
FIG. 5 is a schematic view of a radio frequency-based repeater in accordance with an embodiment of the disclosure.

FIG. 5 is a schematic view of the radio frequency-based repeater 76b depicted in greater detail. The radio frequency-based repeater 76b can include an antenna 260, a communication interface 262, a memory 264, and a processing unit 266 configured to execute a plurality of instructions stored in the memory 264 to boost a transmission characteristic of a portion of electromagnetic signals through the communication interface 262 and the antenna 260. The antenna 260 can be a directional antenna and may include impedance matching to an interfacing environment, e.g., a waveguide medium of waveguides 202, 204 of FIG. 4. The communication interface 262 can be a software defined radio or other protocol to support communication using electromagnetic signals. The memory 264 may include random access memory (RAM), read only memory (ROM), or other electronic, optical, magnetic, or any other computer readable medium onto which is stored data and algorithms in a non-transitory form. The processing unit 266 can be any type or combination of central processing unit (CPU), including one or more of: a microprocessor, a digital signal processor (DSP), a microcontroller, an application specific integrated circuit (ASIC), a field programmable gate array (FPGA), or the like supported in the expected operating environment of the radio frequency-based repeater 76b.

The radio frequency-based repeater 76b can also include a power conditioning circuit 270 and an onboard energy storage system 272 configured to extract and store a portion of energy received from a transmission to power the radio frequency-based repeater 76b. For example, where the available power in electromagnetic signals received in waveguide 202 of FIG. 4 is low or intermittent, energy stored in the onboard energy storage system 272 can be used to power the radio frequency-based repeater 76b. When excess energy is available in the electromagnetic signals received in waveguide 202, the onboard energy storage system 272 can be recharged. The onboard energy storage system 272 may include a battery, a super-capacitor, an ultra-capacitor, or other source of electrical power.

The radio frequency-based repeater 76b can be configured to operate using power extracted from transmissions based on determining that a signal-to-noise ratio is above a threshold such that signal quality is not substantially degraded by extracting energy from the transmissions. The radio frequency-based repeater 76b can also be configured to operate using energy stored in the onboard energy storage system 272 based on determining that the signal-to-noise ratio is below the threshold such that energy extraction from the transmissions may result in lossy/noisy data. The threshold can be determined based on analysis of acceptable signal quality in the associated network, such as network 65 of FIG. 1 and/or guided electromagnetic transmission network 100 of FIG. 2. Thus, simultaneous transmission of electromagnetic signal and power enables the radio frequency-based repeater 76b to capture sufficient energy to power itself and boost the signal when the SNR drops to or falls below a critical value; and further retransmit the signal at a boosted SNR. The radio frequency-based repeater 76b can be actively powered when a power source is available or scavenge low power from energy transmission through the waveguide 202 of FIG. 4.

The radio frequency-based repeater 76a of FIG. 3 may include the antenna 260, communication interface 262, memory 264, and processing unit 266 but exclude the power conditioning circuit 270 and/or onboard energy storage system 272. In high availability embodiments, the radio frequency-based repeater 76a of FIG. 3 may include the power conditioning circuit 270 and onboard energy storage system 272 for backup power support in case of a power issue with the power source 206 of FIG. 3.

Figure 6:
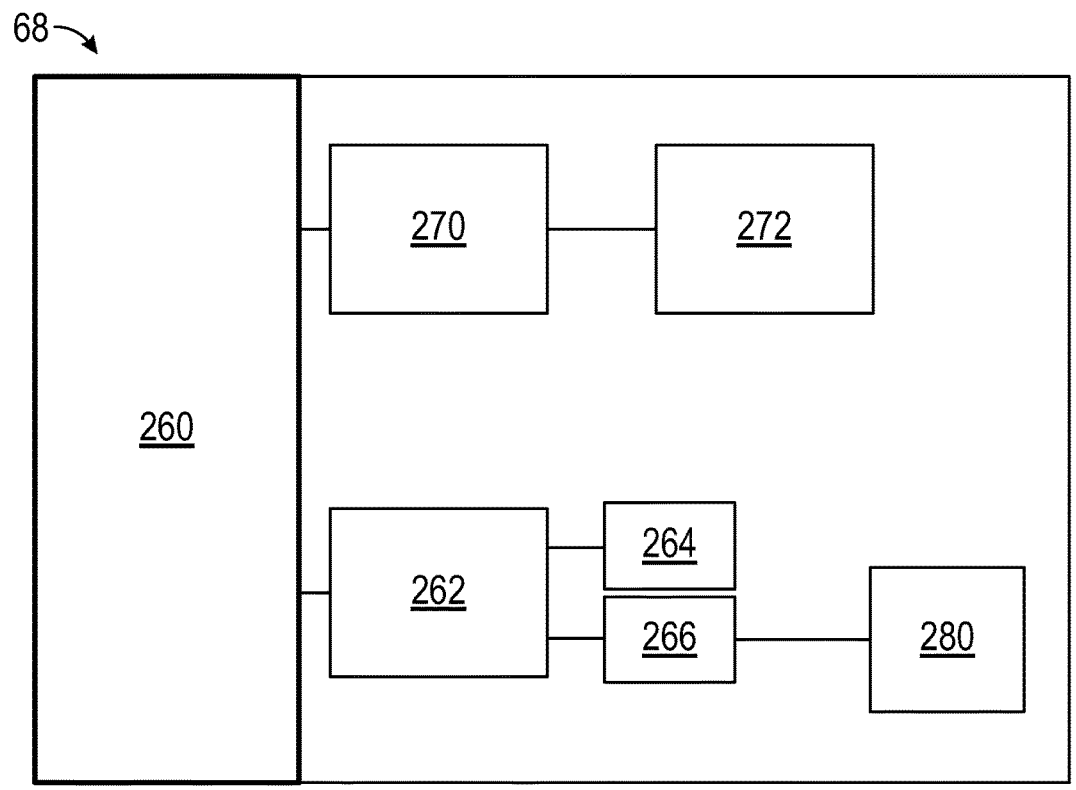
FIG. 6 is a schematic view of a node of a guided electromagnetic transmission network in accordance with an embodiment of the disclosure.

FIG. 6 is a schematic view of the node 68 of FIGS. 3-4 according to an example. The node 68 can include the antenna 260, communication interface 262, memory 264, processing unit 266, power conditioning circuit 270 and onboard energy storage system 272 as previously described with respect to FIG. 5. The node 68 also includes an input/output interface 280 that can be coupled to one or more of the effectors 102 and/or sensors 104 of FIG. 2. The input/output interface 280 can present a wired interface to enable coupling with existing wire-based devices. In some embodiments, one or more of the effectors 102 and/or sensors 104 can be integrated within the node 68. The input/output interface 280 may provide interfaces for particular types of devices, such as capacitive-based devices, voltage-based devices, resistive-based devices, impedance-based devices, current-based devices, and the like. The processing unit 266 can convert values between the communication interface 262 and the input/output interface 280 to support differences in addressing and formatting of data. For example, the communication interface 262 can be tuned to respond to a particular frequency or frequencies associated with the node 68. The processing unit 266 can detect the transmission and enable the transmission to pass through to the input/output interface 280 or perform signal conditioning as needed. For instance, the processing unit 266 may perform digital filtering and use digital-to-analog and/or analog-to-digital converters as needed to digitally process analog data.

Figure 7:
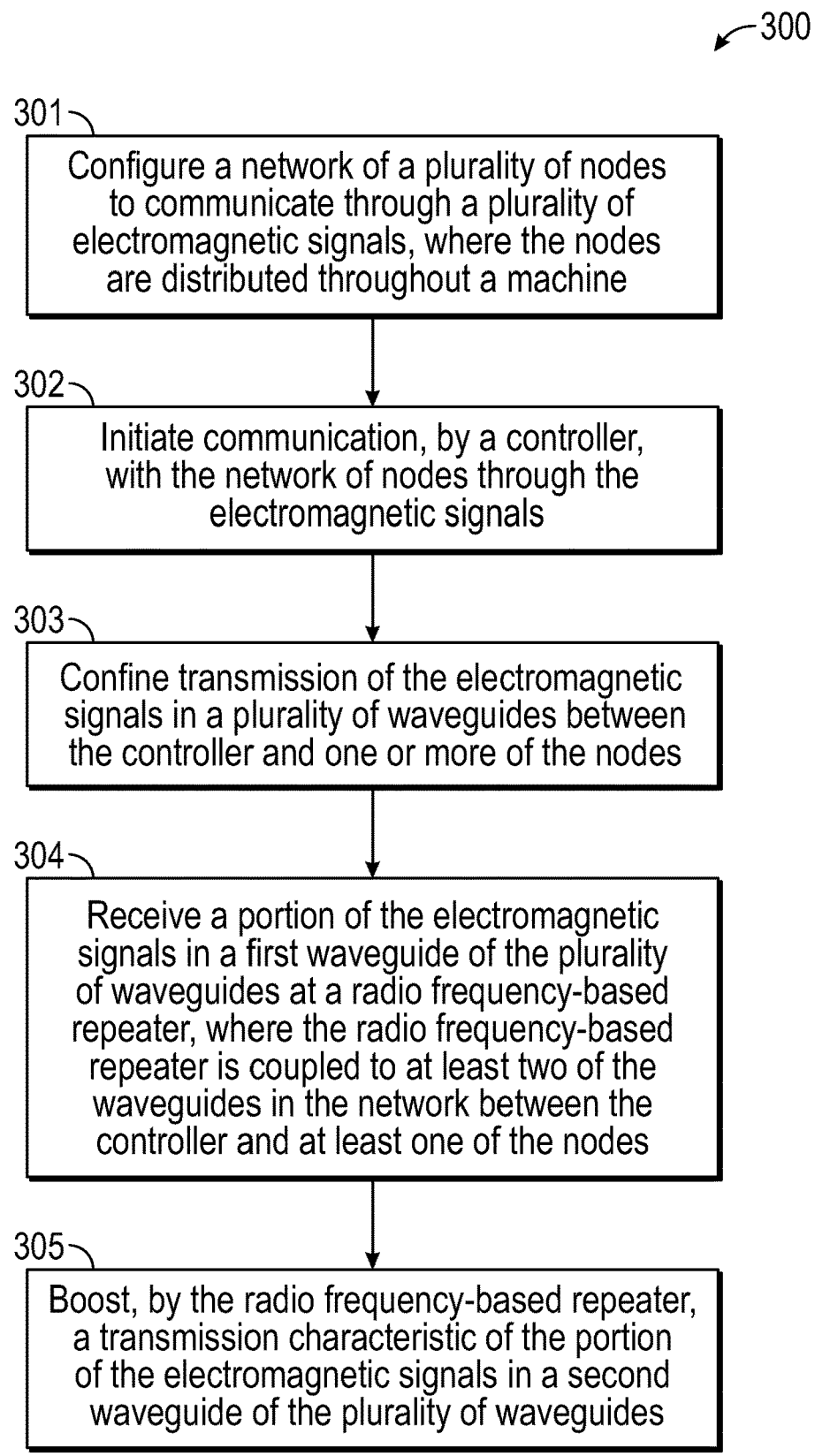
FIG. 7 is a flow chart illustrating a method in accordance with an embodiment of the disclosure.

FIG. 7 is a flow chart illustrating a method 300 of establishing electromagnetic communication through a machine, such as the gas turbine engine 20 of FIG. 1 in accordance with an embodiment. The method 300 of FIG. 7 is described in reference to FIGS. 1-6 and may be performed with an alternate order and include additional steps. For purposes of explanation, the method 300 is primarily described in reference to FIG. 1 but can also be implemented on the guided electromagnetic transmission network 100 of FIG. 2 and other network variations and a variety of machines.

At block 301, a network 65 of a plurality of nodes 68a, 68b can be configured to communicate through a plurality of electromagnetic signals, where the nodes 68a, 68b are distributed throughout a machine, such as the gas turbine engine 20. Multiple nodes 68a, 68b can be used in a complete system 64 to take advantage of architecture scalability. Each of the nodes 68a, 68b can be associated with at least one effector 102 or senor 104 of the gas turbine engine 20. For example, one or more of the nodes 68a, 68b can be located at least one of a fan section 22, a compressor section 24, a combustor section 26, and/or a turbine section 28 of the gas turbine engine 20.

At block 302, a controller 66 can initiate communication with the network 65 of nodes 68a, 68b through the electromagnetic signals, such as electromagnetic signals 86. Specific tones can be used to target desired end-points in the network 65.

At block 303, transmission of the electromagnetic signals is confined in a plurality of waveguides 70-73 between the controller 66 and one or more of the nodes 68a, 68b. The waveguides 70-73 can include a waveguide medium, such as a gas or dielectric. The waveguide medium can be a fluid used by the machine, such as fuel, oil or other fluid in the gas turbine engine 20. Alternatively, the waveguide medium can be an engineered material to support electromagnetic communication.

At block 304, a portion of the electromagnetic signals can be received in a first waveguide 72 of the plurality of waveguides 70-73 at a radio frequency-based repeater 76, where the radio frequency-based repeater 76 is coupled to at least two of the waveguides 70-73 in the network 65 between the controller 66 and at least one of the nodes 68a, 68b.

At block 305, the radio frequency-based repeater 76 can boost a transmission characteristic of the portion of the electromagnetic signals in a second waveguide 73 of the plurality of waveguides 70-73. The transmission characteristic can include one or more of a digital signal-to-noise ratio, an analog signal power level, and a refocused transmission through a directed antenna, such as antenna 260 of FIG. 5. A transmission path of the network 65 can be integrally formed in/on a component of the machine, such as a different section of the gas turbine engine 20.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a machine, the system comprising:
    a network of nodes distributed throughout the machine, the nodes operable to communicate using a plurality of electromagnetic signals;
    a controller operable to communicate with the nodes using electromagnetic signals;
    a plurality of waveguides configured to guide transmission of the electromagnetic signals between the controller and one or more of the nodes; and
    a radio frequency-based repeater coupled to at least two of the waveguides in the network between the controller and at least one of the nodes, wherein the radio frequency-based repeater is configured to extract power from at least one of the electromagnetic signals when a signal-to-noise ratio is above a threshold, and the radio frequency-based repeater is configured to use energy stored in an onboard energy storage system when the signal-to-noise ratio is below the threshold.

2. The system of claim 1, wherein the radio frequency-based repeater is configured to determine the signal-to-noise ratio and cause power extraction based on the signal-to-noise ratio.

3. The system of claim 1, wherein the radio frequency-based repeater comprises an antenna, a communication interface, a memory, and a processing unit configured to execute a plurality of instructions stored in the memory to boost a transmission characteristic of a portion of the electromagnetic signals through the communication interface and the antenna.

4. The system of claim 3, wherein the communication interface comprises a software defined radio.

5. The system of claim 3, wherein the radio frequency-based repeater comprises a power conditioning circuit, and the onboard energy storage system is configured to extract and store a portion of energy received from a transmission to power the radio frequency-based repeater.

6. The system of claim 1, wherein the onboard energy storage system is charged based on detecting excess energy in at least one of the electromagnetic signals.

7. The system of claim 1, wherein the radio frequency-based repeater is actively powered based on detecting availability of a power source.

8. A system for a gas turbine engine, the system comprising:
    a network of nodes distributed throughout the gas turbine engine, each of the nodes associated with at least one sensor or effector of the gas turbine engine and operable to communicate using a plurality of electromagnetic signals;
    a controller of the gas turbine engine operable to communicate with the nodes using the electromagnetic signals;
    a plurality of waveguides configured to guide transmission of the electromagnetic signals between the controller and one or more of the nodes; and
    a radio frequency-based repeater coupled to at least two of the waveguides in the network between the controller and at least one of the nodes, the radio frequency-based repeater comprising a means for extracting power from at least one of the electromagnetic signals when a signal-to-noise ratio is above a threshold and using stored energy when the signal-to-noise ratio is below the threshold.

9. The system of claim 8, wherein one or more of the nodes are located at least one of a fan section, a compressor section, a combustor section and a turbine section of the gas turbine engine, and the at least one sensor is configured to monitor one or more of a pressure, a temperature, a speed, a position, and a vibration.

10. The system of claim 8, wherein the radio frequency-based repeater is configured to determine the signal-to-noise ratio and cause power extraction based on the signal-to-noise ratio.

11. The system of claim 8, wherein the radio frequency-based repeater comprises an antenna, a communication interface, a memory, and a processing unit configured to execute a plurality of instructions stored in the memory to boost a transmission characteristic of the portion of the electromagnetic signals through the communication interface and the antenna.

12. The system of claim 11, wherein the means comprises a power conditioning circuit and an onboard energy storage system configured to extract and store a portion of energy received from a transmission to power the radio frequency-based repeater.

13. The system of claim 12, wherein the onboard energy storage system is charged based on detecting excess energy in at least one of the electromagnetic signals.

14. A method of establishing electromagnetic communication through a machine, the method comprising:
configuring a network of nodes to communicate using a plurality of electromagnetic signals, wherein the nodes are distributed throughout the machine;
initiating communication, by a controller, with the nodes using electromagnetic signals;
confining transmission of the electromagnetic signals in a plurality of waveguides between the controller and one or more of the nodes;
receiving a portion of the electromagnetic signals in a first waveguide of the plurality of waveguides at a radio frequency-based repeater, wherein the radio frequency-based repeater is coupled to at least two of the waveguides in the network between the controller and at least one of the nodes;
operating the radio frequency-based repeater using power extracted from at least one of the electromagnetic signals when a signal-to-noise ratio is above a threshold; and
operating the radio frequency-based repeater using energy stored in an onboard energy storage system when the signal-to-noise ratio is below the threshold.

15. The method of claim 14, wherein the radio frequency-based repeater is configured to determine the signal-to-noise ratio and cause power extraction based on the signal-to-noise ratio.

16. The method of claim 14, wherein the radio frequency-based repeater comprises an antenna, a communication interface, a memory, and a processing unit configured to execute a plurality of instructions stored in the memory to boost a transmission characteristic of the portion of the electromagnetic signals through the communication interface and the antenna.

17. The method of claim 16, wherein the communication interface comprises a software defined radio.

18. The method of claim 16, wherein the radio frequency-based repeater comprises a power conditioning circuit, and the onboard energy storage system is configured to extract and store a portion of energy received from a transmission to power the radio frequency-based repeater.

19. The method of claim 14, further comprising:
charging the onboard energy storage system based on detecting excess energy in at least one of the electromagnetic signals.

20. The method of claim 14, wherein the radio frequency-based repeater is actively powered based on detecting availability of a power source.

* * * * *